United States Patent

Takano et al.

[11] Patent Number: 5,969,347
[45] Date of Patent: Oct. 19, 1999

[54] SYNCHRONIZING APPARATUS OF A CASCADE SCANNING OPTICAL SYSTEM HAVING TILTING MEASUREMENT OF REFLECTING SURFACES

[75] Inventors: Masatoshi Takano; Eiji Takasugi, both of Saitama-ken; Shinji Kikuchi, Tokyo; Tsutomu Sato, Tokyo; Hiroyuki Saito, Tokyo; Yoshiyuki Araki; Mitsunori Iima, both of Saitama-ken; Takashi Sasaki, Nagano-ken; Takashi Iizuka, Saitama-ken, all of Japan

[73] Assignee: Asahi Kogaku Kogyo Kabushiki Kaisha, Tokyo, Japan

[21] Appl. No.: 08/992,812

[22] Filed: Dec. 18, 1997

[30] Foreign Application Priority Data

Dec. 26, 1996 [JP] Japan .................................. 8-348106

[51] Int. Cl.⁶ ...................................................... H01J 3/14
[52] U.S. Cl. .......................... 250/234; 250/236; 359/201; 359/216
[58] Field of Search .................................... 250/234, 235, 250/236; 359/201, 216, 204, 206

[56] References Cited

U.S. PATENT DOCUMENTS 5,877,885  3/1999  Suda et al. ............................... 359/201

FOREIGN PATENT DOCUMENTS

60-57316   4/1985  Japan .
61-11720   1/1986  Japan .

Primary Examiner—Que T. Le
Attorney, Agent, or Firm—Greenblum & Bernstein, P.L.C.

[57] ABSTRACT

A cascade scanning optical system which includes: a first laser scanning optical system having a first polygon mirror, provided with a plurality of first reflecting surfaces, for deflecting a first scanning laser beam to scan a part of a scanning surface to generate a first scanning line; a second laser scanning optical system having a second polygon mirror, provided with a plurality of second reflecting surfaces, for deflecting a second scanning laser beam to scan another part of the scanning surface to generate a second scanning line, wherein the first and second laser scanning optical systems are arranged so as to align the first scanning line with the second scanning line at a point of contact therebetween in a main scanning direction to form a single scanning line; means for measuring a degree of tilt of each of the plurality of first reflecting surfaces and the plurality of second reflecting surfaces; and means for determining combinations of the plurality of first reflecting surfaces with the plurality of second reflecting surfaces in accordance with results of measurements of the measuring means so that the single scanning line is formed by any one of the combinations while minimizing a phase difference between a first phase formed by degrees of tilt of the plurality of first reflecting surfaces and a second phase formed by degrees of tilt of the plurality of the second reflecting surfaces.

12 Claims, 4 Drawing Sheets

SYNCHRONIZING APPARATUS OF A CASCADE SCANNING OPTICAL SYSTEM HAVING TILTING MEASUREMENT OF REFLECTING SURFACES

BACKGROUND OF THE INVENTION

1. Field of the Invention

The present invention relates to a cascade scanning optical system having a pair of laser scanning optical systems which are arranged along the main scanning direction and controlled to operate in synchronization with each other so as to realize a wide scanning line. More specifically the present invention relates to an apparatus of such a cascade scanning optical system, having a pair of laser scanning optical systems, for synchronizing the rotation of a polygon mirror of one laser scanning optical system with the rotation of a polygon mirror of the other laser scanning optical system, to prevent a pair of scanning lines that are to be aligned, respectively generated by the pair of laser scanning optical systems, from being deviated from each other in the sub-scanning direction.

2. Description of the Related Art

A cascade scanning optical system having a plurality of laser scanning optical systems arranged along the main scanning direction to realize a wide scanning line is known. Such a type of scanning optical system is disclosed in Japanese Laid-Open Patent Publication No. 61-11720, published on Jan. 20, 1986. This publication discloses a cascade scanning optical system having a pair of laser scanning optical systems each having a laser beam emitter, a polygon mirror serving as a deflecting device, an fθ lens, etc. The pair of laser scanning optical systems are synchronously driven to emit respective scanning laser beams to a photoconductive surface (scanning surface) of a photoconductive drum on a common line thereon extending in parallel to the axial direction of the photoconductive drum. The pair of scanning laser beams respectively scan two adjacent ranges of the common line on the photoconductive surface so as to scan the photoconductive surface of the photoconductive drum in the main scanning direction in a wide range.

There is a fundamental problem to be overcome in such a type of cascade scanning optical system. Namely, how can a scanning line, made on the photoconductive drum by the scanning laser beam emitted from one laser scanning optical system of the cascade scanning optical system, be accurately aligned with another scanning line, made on the photoconductive drum by the scanning laser beam emitted from another laser scanning optical system of the cascade scanning optical system, so that the scanning lines are not apart from each other in either the main scanning direction or the sub-scanning direction, i.e., so as to form a straight and continuous scanning line through the combination of the separate scanning lines.

It is sometimes the case that each reflecting surface (scanning laser beam deflecting surface) of a polygon mirror used in the cascade scanning optical system slightly tilts from its original position. In the case where the angle of each reflecting surface of the polygon mirror of one laser scanning optical system is different from that of the other corresponding laser scanning optical system, the pair of scanning lines, which are respectively generated by the aforementioned corresponding reflecting surfaces forming a straight and continuous scanning line, will deviate from each other in the sub-scanning direction on the photoconductive drum. This results in a gap or deviation occurring between the two scanning lines in the sub-scanning direction, so that a straight and continuous scanning line will not be formed. A similar problem will arise in the case where one or both of the polygon mirrors rotate with a tremor or oscillation.

SUMMARY OF THE INVENTION

The primary object of the present invention is to provide a synchronizing apparatus of a cascade scanning optical system which can prevent a scanning line, made by the scanning laser beam emitted from one laser scanning optical system, and another scanning line, made by the scanning laser beam emitted from the other laser scanning optical system, from far deviating from each other in the sub-scanning direction on a scanning surface.

To achieve the object mentioned above, according to an aspect of the present invention, there is provided a cascade scanning optical system which includes: a first laser scanning optical system having a first polygon mirror, provided with a plurality of first reflecting surfaces, for deflecting a first scanning laser beam to scan a part of a scanning surface to generate a first scanning line; a second laser scanning optical system having a second polygon mirror, provided with a plurality of second reflecting surfaces, for deflecting a second scanning laser beam to scan another part of the scanning surface to generate a second scanning line, wherein the first and second laser scanning optical systems are arranged so as to align the first scanning line with the second scanning line at a point of contact therebetween in a main scanning direction to form a single scanning line; means for measuring a degree of tilt of each of the plurality of first reflecting surfaces and the plurality of second reflecting surfaces; and means for determining combinations of the plurality of first reflecting surfaces with the plurality of second reflecting surfaces in accordance with results of measurements of the measuring means so that the single scanning line is formed by any one of the combinations while minimizing a phase difference between a first phase formed by degrees of tilt of the plurality of first reflecting surfaces and a second phase formed by degrees of tilt of the plurality of the second reflecting surfaces.

Preferably, the determining means includes means for comparing the degrees of tilt of the plurality of first reflecting surfaces with the degrees of tilt of the plurality of the second reflecting surfaces to judge which reflecting surface of the plurality of first reflecting surfaces has the closest degree of tilt to a reflecting surface of the plurality of the second reflecting surfaces.

Preferably, the measuring means includes: a first position sensitive device for detecting a position of the first scanning laser beam in a sub-scanning direction perpendicular to the main scanning direction to determine the degree of tilt of each of the plurality of first reflecting surfaces; and a second position sensitive device for detecting a position of the second scanning laser beam in the sub-scanning direction to determine the degree of tilt of each of the plurality of second reflecting surfaces.

Preferably, the first position sensitive device is positioned outside a first optical path through which the first scanning laser beam passes to form the first scanning line, and wherein the second position sensitive device is positioned outside a second optical path through which the second scanning laser beam passes to form the second scanning line.

Preferably, the cascade scanning optical system further includes means for storing the degree of tilt of each of the plurality of first reflecting surfaces and the plurality of second reflecting surfaces.

Preferably, the storing means includes: a first memory for storing the degree of tilt of each of the plurality of first reflecting surfaces; and a second memory for storing the degree of tilt of each of the plurality of second reflecting surfaces.

Preferably, the determining means includes means for comparing the degrees of tilt of the plurality of first reflecting surfaces which are stored in the first memory with the degrees of tilt of the plurality of the second reflecting surfaces which are stored in the second memory to judge which reflecting surface of the plurality of first reflecting surfaces has the closest degree of tilt to a reflecting surface of the plurality of the second reflecting surfaces so as to determine the combinations.

Preferably, the measuring means and the determining means each start operating each time a power switch of the cascade scanning optical system is turned ON.

Preferably, the cascade scanning optical system further includes a drum having the scanning surface on a periphery of the drum.

Preferably, the first and second laser scanning optical systems are composed of the same optical elements.

Preferably, the first and second laser scanning optical systems are symmetrically arranged.

According to another aspect of the present invention, there is provided a synchronizing apparatus of a cascade scanning optical system, the cascade scanning optical system including a pair of laser scanning optical systems each having a polygon mirror provided with a plurality of reflecting surfaces, the pair of laser scanning optical systems being arranged to form a single scanning line, wherein the synchronizing apparatus includes: means for measuring a degree of tilt of each of the plurality of reflecting surfaces of the polygon mirrors; and means for determining combinations of the plurality of reflecting surfaces of one of the polygon mirrors with the plurality of reflecting surfaces of the other of the polygon mirrors in accordance with results of measurements of the measuring means so that the single scanning line is formed by any one of the combinations while minimizing a phase difference between a first phase formed by degrees of tilt of the plurality of reflecting surfaces of the one of the polygon mirrors and a second phase formed by degrees of tilt of the plurality of the reflecting surfaces of the other of the polygon mirrors.

The present disclosure relates to subject matter contained in Japanese Patent Application No. 8-348106 (filed on Dec. 26, 1996) which is expressly incorporated herein by reference in its entirety.

BRIEF DESCRIPTION OF THE DRAWINGS

The invention will be described below in detail with reference to the accompanying drawings in which.

DESCRIPTION OF THE PREFERRED EMBODIMENT

Figure 1:
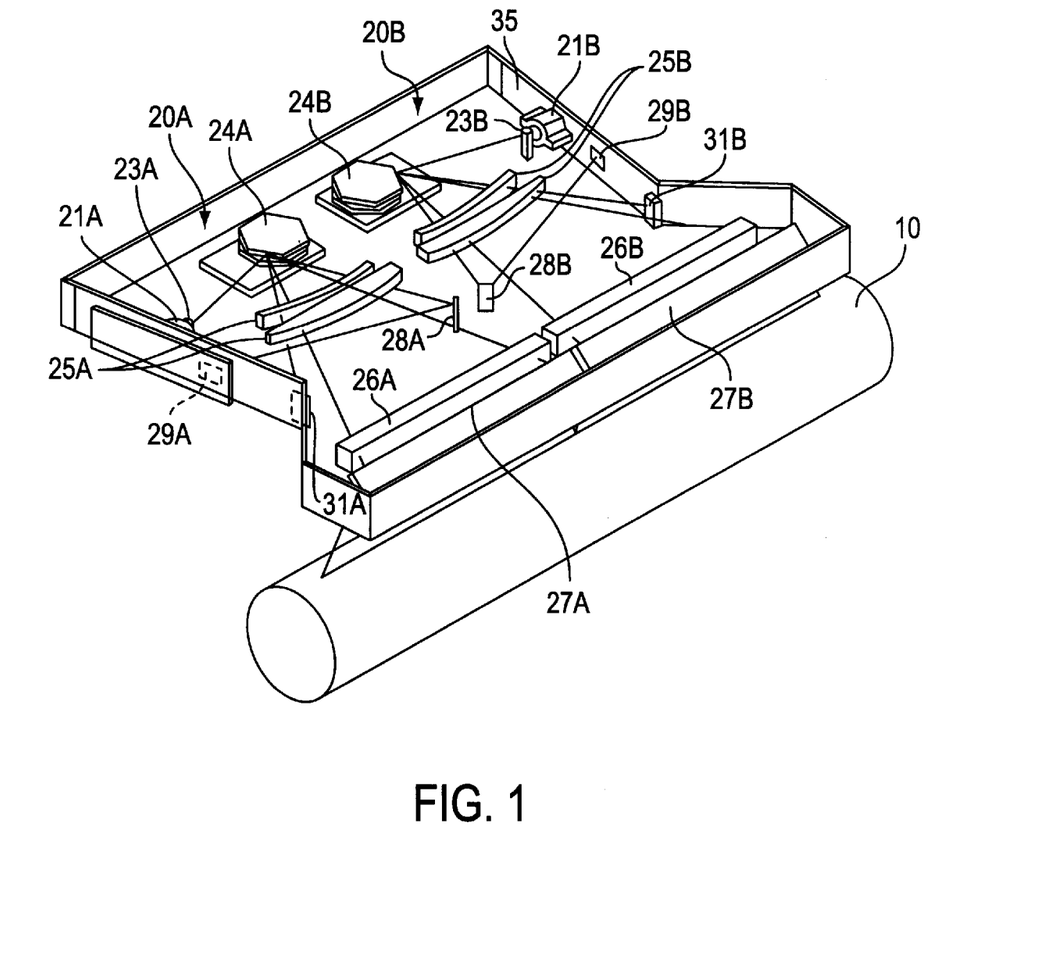
FIG. 1 is a perspective view of an embodiment of a cascade scanning optical system to which the present invention is applied, showing only fundamental elements thereof.

FIG. 1 shows an embodiment of a cascade scanning optical system for scanning the photoconductive surface of a photoconductive drum (rotating member) 10 provided in a laser-beam printer. The cascade scanning optical system is provided with a pair of laser scanning optical systems, i.e., a first scanning optical system 20A and a second scanning optical system 20B. The first and second optical systems 20A and 20B are each designed as a non-telecentric system, so that the incident angle of a scanning laser beam emitted from each of the first and second optical systems 20A and 20B relative to the photoconductive surface of the drum 10 varies in accordance with a variation in the position of the scanning spot of the scanning laser beam on the photoconductive surface in the main scanning direction. The first and second scanning optical systems 20A and 20B are provided with the same optical elements or parts, that is, the first scanning optical system 20A is provided with a laser collimating unit 21A serving as a laser beam emitter, a cylindrical lens 23A, a polygon mirror (scanning laser beam deflector) 24A, an fθ lens group 25A, an auxiliary lens 26A and a mirror 27A, while the second scanning optical system 20B is provided with a laser collimating unit 21B serving as a laser beam emitter, a cylindrical lens 23B, a polygon mirror (scanning laser beam deflector) 24B, an fθ lens group 25B, an auxiliary lens 26B and a mirror 27B. Each of the fθ lens groups 25A and 25B consists of two lens elements as can be seen from FIG. 1. The first and second scanning optical systems 20A and 20B are arranged side by side in a direction parallel to the axial direction of the drum 10 and are supported by a common casing 35 on an inner flat surface thereof.

The laser collimating units 21A and 21B are identical. Each of the laser collimating units 21A and 21B is provided therein with a laser diode LD and a collimating lens group (not shown) for collimating a laser beam emitted from the laser diode LD. In each of the first and second scanning optical systems 20A and 20B, the laser beam emitted from the laser diode LD is collimated through the collimating lens group. Thereafter this collimated laser beam is incident upon the cylindrical lens 23A or 23B positioned in front of the corresponding laser collimating unit 21A or 21B. Each cylindrical lens 23A or 23B has a power in the sub-scanning direction, so that the spot of the laser beam incident thereon is elongated therethrough in the main scanning direction to be incident upon the corresponding polygon mirror 24A or 24B. The polygon mirrors 24A and 24B are each rotated, so that laser beams incident thereon are deflected in the main scanning direction to proceed toward the mirrors 27A and 27B through the fθ lens groups 25A and 25B and the auxiliary lenses 26A and 26B, respectively. Subsequently, the laser beams incident upon the mirrors 27A and 27B are reflected thereby towards the photoconductive drum 10, to thereby scan the same in the main scanning direction.

Figure 2:
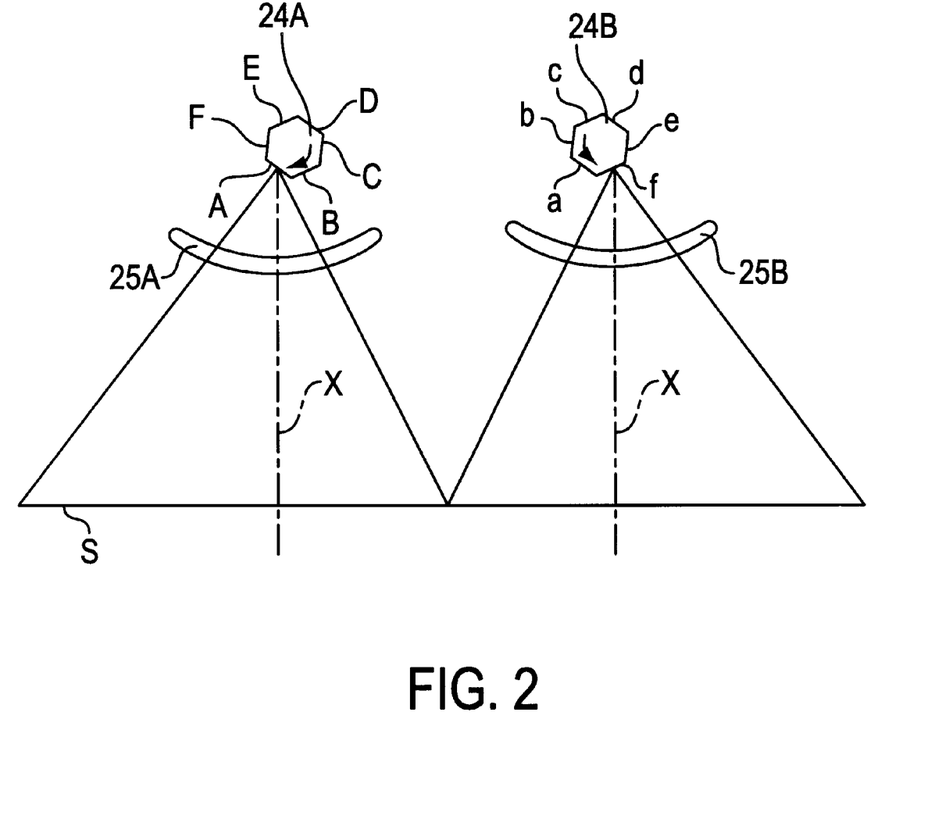
FIG. 2 is a plan view of a part of the cascade scanning optical system shown in FIG. 1.

Each of the auxiliary lenses 26A and 26B has a power mainly in the sub-scanning direction. In order to reduce the size of the cascade scanning optical system, it is possible to omit each of the auxiliary lenses 26A and 26B. In such a case, the design of the fθ lens groups 25A and 25B would be modified in such a way that they would have the equivalent power to that of the combined power of the original fθ lens groups 25A and 25B and the auxiliary lenses 26A and 26B, respectively. In FIG. 2, "X" represents an optical axis of the fθ lens group 25A or 25B. The optical axis X extends perpendicular to the main scanning direction. "S" represents the photoconductive surface of the drum 10. The auxiliary lenses 26A and 26B and the mirrors 27A and 27B are not illustrated in either FIG. 2 or 4.

The polygon mirror 24A rotates in a clockwise direction while the polygon mirror 24B rotates in a counterclockwise direction, as viewed in FIG. 2. Namely, the polygon mirrors 24A and 24B rotate in opposite rotational directions to scan the photoconductive surface of the drum 10 from its approximate center toward respective opposite ends in opposite directions. A mirror 28A is fixedly provided in the casing 35 at a position to receive the scanning laser beam emitted from the fθ lens group 25A before the scanning laser beam is incident on the photoconductive surface of the drum 10 through the auxiliary lens 26A and the mirror 27A at each scanning sweep while the polygon mirror 24A rotates. The laser beam reflected by the mirror 28A is incident on a laser beam detector (BD) 29A fixedly provided in the casing 35 at a position opposite to the mirror 28A. Likewise, a mirror 28B is fixedly provided in the casing 35 at a position to receive the scanning laser beam emitted from the fθ lens group 25B before the scanning laser beam is incident on the photoconductive surface of the drum 10 through the auxiliary lens 26B and the mirror 27B at each scanning sweep while the polygon mirror 24B rotates. The laser beam reflected by the mirror 28B is incident on a laser beam detector (BD) 29B fixedly provided in the casing 35 at a position opposite to the mirror 28B.

The laser diodes LD of the laser collimating units 21A and 21B are each controlled to turn its laser emission ON or OFF in accordance with given image data to draw a corresponding image (charge-latent image) on the photoconductive surface of the drum 10, and subsequently this image drawn on the photoconductive surface of the drum 10 is transferred to plain paper according to a conventional electrophotographic method. The polygon mirrors 24A and 24B are controlled synchronously with the use of the laser beam detectors 29A and 29B such that on the photoconductive surface of the drum 10 the scanning starting point of a spot of the scanning laser beam emitted from the first scanning optical system 20A is properly and precisely adjacent to the scanning starting point of a spot of the scanning laser beam emitted from the second scanning optical system 20B, and that those two spots move in opposite directions apart from each other in the main scanning direction to thereby form a wide scanning line on the photoconductive surface of the drum 10. With the rotational movement of the photoconductive drum 10 which is synchronized to the rotational movement of each of the polygon mirrors 24A and 24B, a series of wide scanning lines are made on the photoconductive surface of the drum 10 to thereby obtain a certain image (charge-latent image) on the photoconductive surface of the drum 10.

The polygon mirror 24A has a regular hexagonal cross section and is provided along a circumference thereof with six reflecting surfaces (scanning laser beam deflecting surfaces) A, B, C, D, E and F. Likewise, the polygon mirror 24B has a regular hexagonal cross section and is provided along a circumference thereof with corresponding six reflecting surfaces (scanning laser beam deflecting surfaces) a, b, c, d, e and f. In either polygon mirror 24A or 24B, there is a possibility of each reflecting surface tilting from its original position. Such tilt causes the position of the spot of the corresponding scanning laser beam to deviate on the photoconductive surface in the sub-scanning direction. In the case where the degree (amount) of tilt of one reflecting surface of the polygon mirror 24A is different from that of a corresponding reflecting surface of the polygon mirror 24B, opposing ends of two scanning lines to be combined which are formed by a pair of scanning laser beams on the photoconductive surface will be apart from each other in the sub-scanning direction. With a synchronizing apparatus which will be hereinafter discussed such a problem of deviation of opposing ends of the two scanning lines in the sub-scanning direction is effectively prevented from occurring.

Figure 3A:
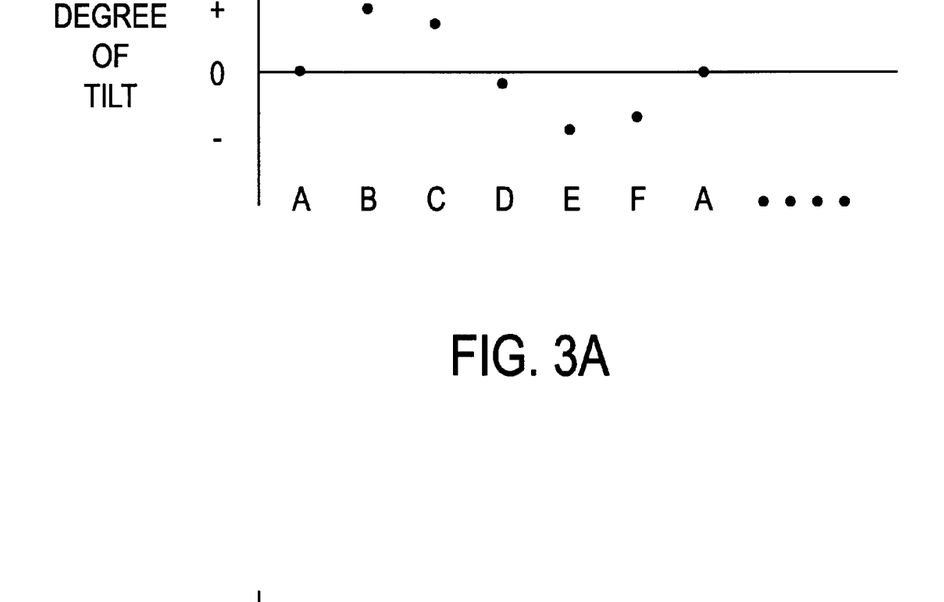
FIG. 3A is a graph showing the degree of tilt of each reflecting surface of the first of the pair of polygon mirrors shown in FIG. 1 or 2 in one example.
Figure 3B:
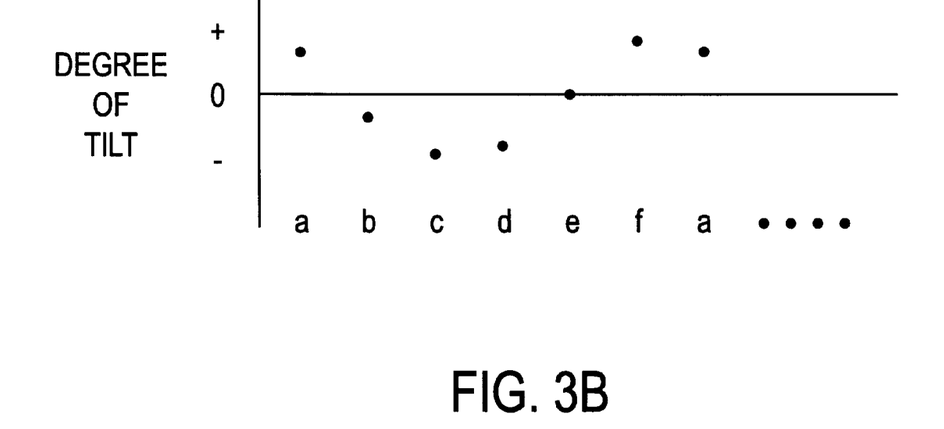
FIG. 3B is a graph showing the degree of tilt of each reflecting surface of the second of the pair of polygon mirrors shown in FIG. 1 or 2 in the one example.

A first PSD (semiconductor position sensitive device) 31A is fixedly provided in the casing 35 at a position in the vicinity of the laser beam detector 29A to receive the scanning laser beam emitted from the fθ lens group 25A after the scanning laser beam has completed a single scanning at each scanning sweep while the polygon mirror 24A rotates. Likewise, a second PSD (semiconductor position sensitive device) 31B is fixedly provided in the casing 35 at a position in the vicinity of the laser beam detector 29B to receive a laser beam emitted from the fθ lens group 25B after the scanning laser beam has completed a single scanning at each scanning sweep while the polygon mirror 24B rotates. Each PSD 31A, 31B detects the position of a scanning laser beam received, emitted from the corresponding polygon mirror 24A or 24B, in the sub-scanning direction so as to determine the degree of tilt of each reflecting surface of the corresponding polygon mirror 24A or 24B. FIG. 3A is a graph showing the degree of tilt of each reflecting surface (A, B, C, D, E and F) of the polygon mirror 24A while FIG. 3B is a graph showing the degree of tilt of each reflecting surface (a, b, c, d, e and f) of the polygon mirror 24B, in an example. As can be seen from FIGS. 3A and 3B, in either polygon mirror 24A or 24B the degree of tilt periodically varies to substantially form a sine curve. In the present embodiment a point at which the phases of the two sine curves coincides with each other most is determined to synchronize the rotation of the polygon mirror 24A with the rotation of the polygon mirror 24B so as to form a wide scanning line on the photoconductive surface of the drum 10 by a corresponding pair (determined pair) of reflecting surfaces of the polygon mirrors 24A and 24B. In the illustrated particular example shown in FIGS. 3A and 3B, a deviation of a pair of scanning lines respectively generated by the polygon mirrors 24A and 24B on the photoconductive surface in the sub-scanning direction will be greatly reduced or substantially eliminated if the rotation of the polygon mirror 24A is synchronized with the rotation of the polygon mirror 24B with the reflecting surface 'A' of the polygon mirror 24A coincident with the reflecting surface 'e' of the polygon mirror 24B, as will be appreciated from FIGS. 3A and 3B.

Figure 4:
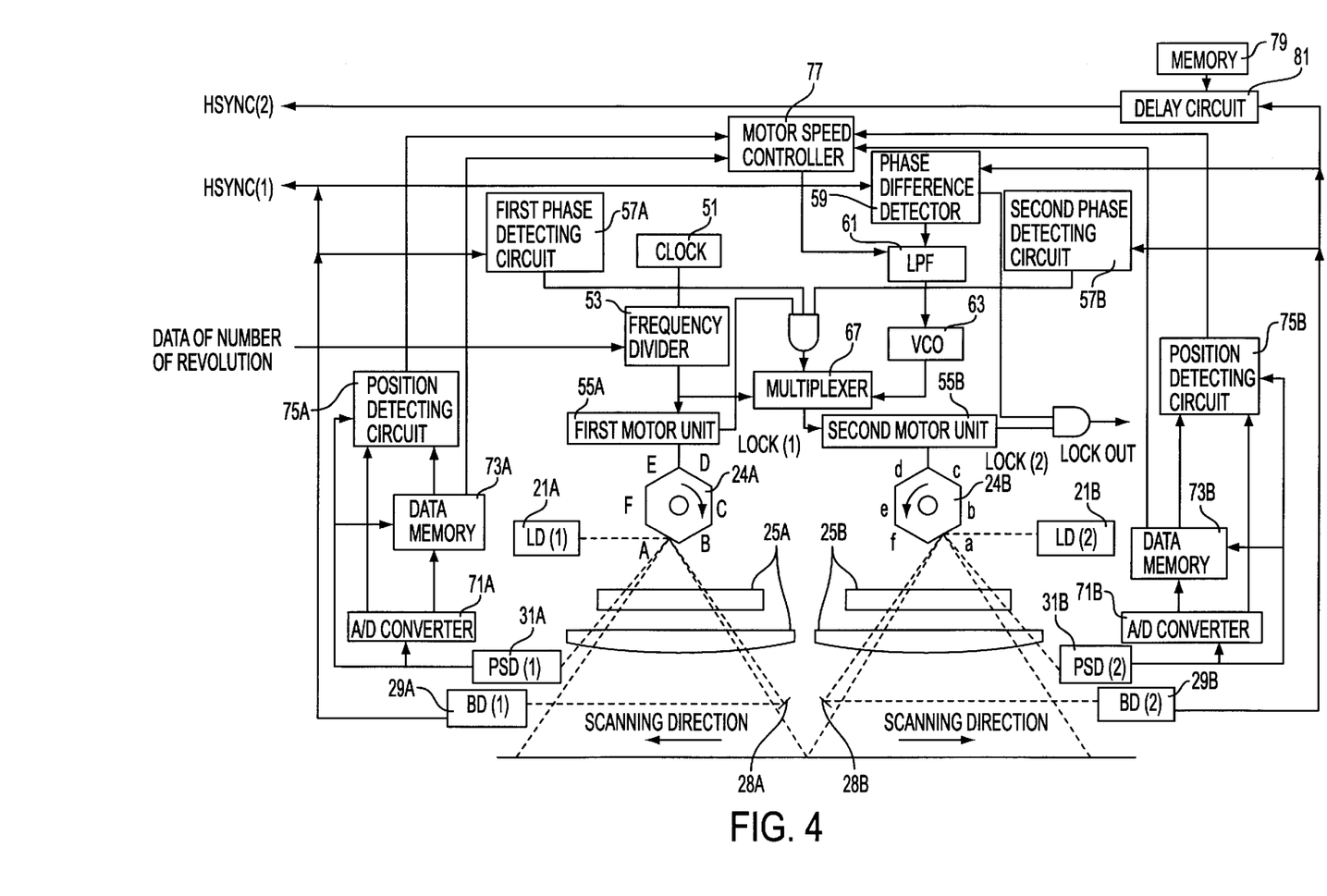
FIG. 4 is a block diagram of a synchronizing apparatus of the cascade scanning optical system.

FIG. 4 shows a block diagram of the synchronizing apparatus of the cascade scanning optical system which realizes the aforementioned synchronizing process. The first and second polygon mirrors 24A and 24B are rotated by first and second motor units 55A and 55B, respectively. When the first and second motor units 55A and 55B start operating upon the power switch turned ON, the motor units 55A and 55B are each controlled, rotating with common clock pulses output from a frequency divider 53 which receives clock pulses from a clock pulse generator 51. After the rotation of each motor unit 55A, 55B has become stable and the PLL (phase-lock loop) starts, the rotational speed of the second polygon mirror 24B, i.e., the rotational speed of the second motor unit 55B, is controlled in accordance with signals which are output from the second laser beam detector 29B each time the first laser beam detector 29A detects the laser beam emitted from the first polygon mirror 24A.

The first laser beam detector 29A outputs a signal to both a first phase detecting circuit 57A and a phase-difference detector 59 at the time the first laser beam detector 29A detects a scanning laser beam. The second laser beam detector 29B outputs a signal to each of: a second phase detecting circuit 57B, the phase-difference detector 59, and a delay circuit (time-delay circuit) 81 at the time the second laser beam detector 29B detects a scanning laser beam. The phase-difference detector 59 determines a phase difference between the phase of signals output from the first laser beam detector 29A and the phase of signals output from the second laser beam detector 29B in accordance with the signals input from the first and second laser beam detectors 29A and 29B to output a phase difference indicating voltage to an LPF (low pass filter) 61. The terms "phase difference indicating voltage" herein used mean a voltage which indicates the magnitude of a phase difference. In the case where the phase of signals output from the second laser beam detector 29B follows the phase of signals output from the first laser beam detector 29A, the phase-difference detector 59 outputs a positive phase difference indicating voltage. Conversely, in the case where the phase of signals output from the second laser beam detector 29B precedes the phase of signals output from the first laser beam detector 29A, the phase-difference detector 59 outputs a negative phase difference indicating voltage.

Inputting a phase difference indicating voltage output from the phase-difference detector 59, the LPF 61 converts the phase difference indicating voltage into a DC voltage corresponding to the magnitude of the input phase difference indicating voltage. Subsequently, the LPF 61 outputs the DC voltage to a VCO (voltage controlled oscillator) 63. The VCO 63 changes the frequency of clock pulses output therefrom in accordance with the DC voltage input from the LPF 61 In this particular embodiment, the VCO 63 outputs clock pulses having a high frequency to a multiplexer 67 when the DC voltage input from the LPF 61 is a high voltage, while the VCO 63 outputs clock pulses having a low frequency to the multiplexer 67 when the DC voltage input from the LPF 61 is a low voltage. The multiplexer 67 adjusts clock pulses input from the frequency divider 53 in accordance with clock pulses input from the VCO 63 to output the adjusted clock pulses to the second motor unit 55B. Accordingly, in the case where the phase of signals output from the second laser beam detector 29B follows that of the first laser beam detector 29A, the rotational speed of the second motor unit 55B increases. Conversely, in the case where the phase of signals output from the second laser beam detector 29B precedes that of the first laser beam detector 29A, the rotational speed of the second motor unit 55B decreases.

When detecting a scanning laser beam, each PSD 31A, 31B outputs a voltage corresponding to the detected position of the received scanning laser beam. The voltage output from the first PSD 31A is converted into digital signals by an A/D converter 71A to be stored in a data memory 73A as data (first data group) representing the degrees of tilt of the reflecting surfaces A, B, C, D, E and F of the first polygon mirror 24A. Similarly, the voltage output from the second PSD 31B is converted into digital signals by an A/D converter 71B to be stored in a data memory 73B as data (second data group) representing the degrees of tilt of the reflecting surfaces a, b, c, d, e and f of the second polygon mirror 24B. It is preferable to measure each of the aforementioned first and second data groups more than once and store the average values of the first data group and the average values of the second data group in the data memories 73A and 73B, respectively, so as to improve the reliability of each of the first and second data groups.

After the degrees of tilt of the reflecting surfaces of the first polygon mirror 24A have all been stored in the data memory 73A, a reflecting-surface position detecting circuit 75A firstly detects the degree of tilt of any one of the reflecting surfaces of the first polygon mirror 24A, which rotates at a fixed rotational speed, by inputting a signal from the first PSD 31A through the A/D converter 71A. Subsequently the reflecting-surface position detecting circuit 75A inputs the values from the first data group stored in the data memory 73A and compares each stored degree of tilt in the first data group with the detected degree of tilt of the aforementioned reflecting surface of the first polygon mirror 24A to determine which one of the reflecting surfaces A, B, C, D, E or F of the first polygon mirror 24A is the aforementioned reflecting surface of the first polygon mirror 24A. Thereafter the reflecting-surface position detecting circuit 75A outputs the data (first surface data) representing one of the reflecting surfaces A, B, C, D, E or F of the first polygon mirror 24A which is the aforementioned reflecting surface of the first polygon mirror 24A, to a motor speed controller 77.

Likewise, after the degrees of tilt of the reflecting surfaces of the second polygon mirror 24B have all been stored in the data memory 73B, a reflecting-surface position detecting circuit 75B firstly detects the degree of tilt of any one of reflecting surfaces of the second polygon mirror 24B, which rotates at a fixed rotational speed, by inputting a signal from the second PSD 31B through the A/D converter 71B. Subsequently the reflecting-surface position detecting circuit 75B inputs the values of the second data group stored in the data memory 73B and compares each stored degree of tilt in the second data group with the detected degree of tilt of the aforementioned reflecting surface of the second polygon mirror 24B to determine which one of the reflecting surfaces a, b, c, d, e or f of the second polygon mirror 24B is the aforementioned reflecting surface of the second polygon mirror 24B. Thereafter the reflecting-surface position detecting circuit 75B outputs the data (second surface data) representing one of the reflecting surfaces a, b, c, d, e or f of the second polygon mirror 24B which is the aforementioned reflecting surface of the second polygon mirror 24B, to the motor speed controller 77.

The motor speed controller 77 compares the first surface data input from the reflecting-surface position detecting circuit 75A and the corresponding data stored in the data memory 73A which represents the degree of tilt of the aforementioned reflecting surface of the first polygon mirror 24A with the second surface data input from the reflecting-surface position detecting circuit 75B and the corresponding data stored in the data memory 73B which represents the degree of tilt of the aforementioned reflecting surface of the second polygon mirror 24B to determine a phase difference between the phase of the degrees of tilt of reflecting surfaces of the first polygon mirror 24A and the phase of the degrees of tilt of reflecting surfaces of the second polygon mirror 24B. Namely, it is determined which degree of tilt of the reflecting surfaces A, B, C, D, E or F of the first polygon mirror 24A is closest to which degree of tilt of the reflecting surfaces a, b, c, d, e or f of the second polygon mirror 24B. Thereafter, with the reflecting surfaces A, B, C, D, E and F of the first polygon mirror 24A regarded as reference surfaces, the motor speed controller 77 converts the phase difference into a voltage (phase difference indicating voltage) to be output to the LPF 61.

The LPF 61 converts the voltage input from the motor speed controller 77 into a DC voltage corresponding to the magnitude of the input voltage and outputs the DC voltage to the VCO 63. The VCO 63 varies the frequency of clock pulses output therefrom in accordance with the DC voltage input from the LPF 61. Due to the variation in frequency of clock pulses output from the VCO 63, the rotational speed of the second motor unit 55B is controlled to increase or decrease so as to match the phase of a sine curve formed by the degrees of tilt of the reflecting surfaces of the first polygon mirror 24A with the phase of a sine curve formed by the degrees of tilt of the reflecting surfaces of the second polygon mirror 24B, so that the combinations of the reflecting surfaces A, B, C, D, E and F with the reflecting surfaces a, b, c, d, e and f change, i.e., the correspondence of each of the reflecting surfaces A, B, C, D, E and F with a corresponding reflecting surface a, b, c, d, e or f changes. At the time the motor speed controller 77 detects a condition that the data representing the degree of tilt of any one of the reflecting surfaces A, B, C, D, E and F substantially corresponds to the data representing the degree of tilt of a corresponding reflecting surfaces a, b, c, d, e or f which is currently synchronized with the aforementioned any one of the reflecting surfaces A, B, C, D, E and F, the motor speed controller 77 stops outputting the voltage (phase difference indicating voltage) to the LPF 61 so as to maintain the current phase (correspondence of reflecting surfaces), which completes the synchronizing process of the present embodiment. Thereafter the synchronization of rotation of the first and second polygon mirrors 24A and 24B is maintained according to the phase difference indicating voltage output from the phase-difference detector 59.

In the illustrated particular example shown in FIGS. 3A and 3B, after the above synchronizing process has been completed, the reflecting surface A of the first polygon mirror 24A corresponds to the reflecting surface e of the second polygon mirror 24B. Accordingly, the motor speed controller 77 adjusts the rotational speed of the second motor unit 55B to synchronize the reflecting surface A of the first polygon mirror 24A with the reflecting surface e of the second polygon mirror 24B.

The motor speed controller 77 can determine the phase difference between the sine curve of the degrees of tilt of reflecting surfaces of the first polygon mirror 24A and the sine curve of the degrees of tilt of reflecting surfaces of the second polygon mirror 24B, using all the aforementioned data input from each of the data memories 73A and 73B and the reflecting-surface position detecting circuits 75A and 75B, in accordance with either one of the following two practical methods.

[First method]

Regarding each of the first and second polygon mirrors 24A and 24B, among the data representing the degrees of tilts of the six reflecting surfaces a specific reflecting surface whose degree of tilt is the largest is ranked as Level 3. The other five reflecting surfaces which follow the specific reflecting surface in time order are ranked Levels 4, 5, 6, 1 and 2, respectively. In the example shown in FIG. 3A the reflecting surface B is ranked as Level 3. In the example shown in FIG. 3B the reflecting surface f is ranked as Level 3.

Thereafter, one of the reflecting surfaces of the second polygon mirror 24B which is currently synchronized with the aforementioned specific reflecting surface of the first polygon mirror 24A whose degree of tilt is the largest is detected. Subsequently the Level value of the detected one of the reflecting surfaces of the second polygon mirror 24B is subtracted from the Level value of the aforementioned specific reflecting surface. The larger the absolute value of the result of such a subtraction is, the larger the phase difference is. Therefore, an amount of variation in the number of revolutions of the second polygon mirror 24B per a certain period of time can be determined based on the result of the aforementioned subtraction. At the same time, by knowing whether the result of the subtraction is a negative value or a positive value, it can be judged whether the phase of the sine curve representing the degrees of tilt of reflecting surfaces of the second polygon mirror 24B precedes or follows the phase of the sine curve representing the degrees of tilt of reflecting surfaces of the first polygon mirror 24A, i.e., whether the number of revolutions of the second polygon mirror 24B per a certain period of time should be increased or decreased can be determined. This operation is completed when the result of the aforementioned subtraction becomes zero (0). In this first method, although a specific reflecting surface whose degree of tilt is the largest is ranked as Level 3, a specific reflecting surface whose degree of tilt is the smallest may be ranked as Level 3 (reference level).

[Second Method]

The value of the degree of tilt of the reflecting surface 'a' is subtracted from the value of degree of tilt of one of the reflecting surfaces A, B, C, D, E and F which is currently synchronized with the reflecting surface 'a', and the result of that subtraction is stored in memory. Similarly, the value of the degree of tilt of the reflecting surface 'b' is subtracted from the value of the degree of tilt of another one of the reflecting surfaces A, B, C, D, E and F which is currently synchronized with the reflecting surface 'b', and the result of that subtraction is stored in memory. A similar operation is performed for each of the remaining four reflecting surfaces c, d, e and f. After all the six results have been obtained, the number of revolution of the second polygon mirror 24B per a certain period of time is adjusted such that the sum of the absolute values of the six results will be minimal.

The processing in either the first or second method can start to be performed each time the power switch of the apparatus is turned ON, i.e. each time the first and second motor units 55A and 55B start operating, or during the idle of each motor units 55A, 55B at the time a certain period of time elapses after the power switch of the apparatus is turned ON.

In FIG. 4, "HSYNC 1" and "HSYNC 2" shown on the left side of the drawing each represent a reference signal for commencing an operation of writing main scanning data. A delay circuit (time-delay circuit) 81 delays the output signal by a specific time interval with respect to the input signal, so that the commencement of each scanning sweep made by the second scanning optical system 20B is delayed by the aforementioned specified time interval with respect to the commencement of each scanning sweep made by the first scanning optical system 20A. The data of the specified time interval (delay-time data) is prestored in memory 79, so that the delay circuit 81 inputs the delay-time data from the memory 79 and outputs the reference signal HSYNC 2 in accordance with the delay-time data.

As can be understood from the foregoing, according to the present embodiment of the cascade scanning optical system, a deviation between a scanning line made by the scanning laser beam emitted from one laser scanning optical system and another scanning line made by the other laser scanning optical system, which are to be aligned to form a straight and continuous scanning line, can be fallen into an acceptable range of deviation.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A cascade scanning optical system, comprising:
   a first laser scanning optical system having a first polygon mirror, provided with a plurality of first reflecting surfaces, that deflect a first scanning laser beam to scan a part of a scanning surface to generate a first scanning line;
   a second laser scanning optical system having a second polygon mirror, provided with a plurality of second reflecting surfaces, that deflect a second scanning laser beam to scan another part of said scanning surface to generate a second scanning line, wherein said first and second laser scanning optical systems are arranged so as to align said first scanning line with said second scanning line at a point of contact therebetween in a main scanning direction to form a single scanning line;
   a measurer that measures a degree of tilt of each of said plurality of first reflecting surfaces and said plurality of second reflecting surfaces; and
   a determiner that determines combinations of said plurality of first reflecting surfaces with said plurality of second reflecting surfaces in accordance with results of measurements of said measurer so that said single scanning line is formed by any one of said combinations while minimizing a phase difference between a first phase formed by degrees of tilt of said plurality of first reflecting surfaces and a second phase formed by degrees of tilt of said plurality of said second reflecting surfaces.

2. The cascade scanning optical system according to claim 1, wherein said determiner comprises a comparator that compares said degrees of tilt of said plurality of first reflecting surfaces with said degrees of tilt of said plurality of said second reflecting surfaces to judge which reflecting surface of said plurality of first reflecting surfaces has the closest degree of tilt to a reflecting surface of said plurality of said second reflecting surfaces.

3. The cascade scanning optical system according to claim 1, wherein said measurer comprises:
   a first position sensitive device that detects a position of said first scanning laser beam in a sub-scanning direction perpendicular to said main scanning direction to determine said degree of tilt of each of said plurality of first reflecting surfaces; and
   a second position sensitive device that detects a position of said second scanning laser beam in said sub-scanning direction to determine said degree of tilt of each of said plurality of second reflecting surfaces.

4. The cascade scanning optical system according to claim 3, wherein said first position sensitive device is positioned outside a first optical path through which said first scanning laser beam passes to form said first scanning line, and wherein said second position sensitive device is positioned outside a second optical path through which said second scanning laser beam passes to form said second scanning line.

5. The cascade scanning optical system according to claim 3, further comprising a storing device that stores said degree of tilt of each of said plurality of first reflecting surfaces and said plurality of second reflecting surfaces.

6. The cascade scanning optical system according to claim 5, wherein said storage device comprises:
   a first memory that stores said degree of tilt of each of said plurality of first reflecting surfaces; and
   a second memory that stores said degree of tilt of each of said plurality of second reflecting surfaces.

7. The cascade scanning optical system according to claim 6, wherein said determiner comprises means for comparing said degrees of tilt of said plurality of first reflecting surfaces which are stored in said first memory with said degrees of tilt of said plurality of said second reflecting surfaces which are stored in said second memory to judge which reflecting surface of said plurality of first reflecting surfaces has a closest degree of tilt to a reflecting surface of said plurality of said second reflecting surfaces so as to determine said combinations.

8. The cascade scanning optical system according to claim 1, wherein said measurer and said determiner each start operating each time a power switch of said cascade scanning optical system is turned ON.

9. The cascade scanning optical system according to claim 1, further comprising a drum having said scanning surface on a periphery of said drum.

10. The cascade scanning optical system according to claim 1, wherein said first and second laser scanning optical systems are composed of the same optical elements.

11. The cascade scanning optical system according to claim 10, wherein said first and second laser scanning optical systems are symmetrically arranged.

12. A synchronizing apparatus of a cascade scanning optical system, said cascade scanning optical system including a pair of laser scanning optical systems each having a polygon mirror provided with a plurality of reflecting surfaces, said pair of laser scanning optical systems being arranged to form a single scanning line, wherein said synchronizing apparatus comprises:
   a measurer that measures a degree of tilt of each of said plurality of reflecting surfaces of said polygon mirrors; and
   a determiner that determines combinations of said plurality of reflecting surfaces of one of said polygon mirrors with said plurality of reflecting surfaces of the other of said polygon mirrors in accordance with results of measurements of said measurer so that said single scanning line is formed by any one of said combinations while minimizing a phase difference between a first phase formed by degrees of tilt of said plurality of reflecting surfaces of said one of said polygon mirrors and a second phase formed by degrees of tilt of said plurality of said reflecting surfaces of said other of said polygon mirrors.

* * * * *